US011636804B2

(12) United States Patent
Klement et al.

(10) Patent No.: US 11,636,804 B2
(45) Date of Patent: Apr. 25, 2023

(54) POWER SUPPLY REGULATION BASED ON IMAGE CONTENT

(71) Applicant: Meta Platforms Technologies, LLC, Menlo Park, CA (US)

(72) Inventors: Alexander Klement, Kenmore, WA (US); Yuming Liu, Mountain View, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/134,107

(22) Filed: Dec. 24, 2020

(65) Prior Publication Data

US 2022/0208086 A1 Jun. 30, 2022

(51) Int. Cl.
*G09G 3/3208* (2016.01)
*H02J 7/00* (2006.01)
*H02M 3/156* (2006.01)

(52) U.S. Cl.
CPC ..... *G09G 3/3208* (2013.01); *G09G 2320/103* (2013.01); *G09G 2330/021* (2013.01); *H02J 7/0063* (2013.01); *H02M 3/156* (2013.01)

(58) Field of Classification Search
CPC .......... G09G 3/3208; G09G 2320/103; G09G 2330/021; H02J 7/0063; H02M 3/156
See application file for complete search history.

(56) References Cited

U.S. PATENT DOCUMENTS 6,504,524 B1   1/2003   Gates et al.
6,531,997 B1   3/2003   Gates et al.
2003/0137521 A1* 7/2003 Zehner ............... G02F 1/167
                                                            345/589
2005/0001812 A1* 1/2005 Amundson ........... G09G 3/38
                                                            345/107
2005/0024353 A1* 2/2005 Amundson ........... G09G 3/344
                                                            345/204
2007/0205964 A1* 9/2007 Nagaki ................ G09G 3/296
                                                            345/60

(Continued)

OTHER PUBLICATIONS

International Search Report and Written Opinion for International Application No. PCT/US2021/064824 dated May 2, 2022, 10 pages.

*Primary Examiner* — Amare Mengistu
*Assistant Examiner* — Jennifer L Zubajlo
(74) *Attorney, Agent, or Firm* — Fenwick & West LLP

(57) ABSTRACT

A power supply unit adapts based on an image to be displayed by a display panel. The power supply unit includes a controller circuit for generating a control signal, and a converter circuit for generating an output supply voltage based on the control signal. The controller circuit includes a first look-up table (LUT) storing a set of lower limit values, and a second LUT storing a set of upper limit values. Moreover, the controller circuit includes a microcontroller for receiving an on-pixel-ratio (OPR) value and identifying an entry in the first LUT and the second LUT from the received OPR value. The controller circuit further includes an output circuit for generating the control signal between a first voltage corresponding to a lower limit stored in the identified entry in the first LUT and a second voltage corresponding to an upper limit stored in the identified entry in the second LUT.

17 Claims, 9 Drawing Sheets

(56) References Cited

U.S. PATENT DOCUMENTS

| | | | | |
|---|---|---|---|---|
| 2009/0179923 A1* | 7/2009 | Amundson | ............ | G09G 3/2018 |
| | | | | 345/690 |
| 2012/0320019 A1* | 12/2012 | Jeong | .................... | G09G 3/2096 |
| | | | | 345/87 |
| 2015/0364076 A1* | 12/2015 | Park | ...................... | G09G 3/3233 |
| | | | | 345/77 |
| 2016/0049113 A1* | 2/2016 | Park | ...................... | G09G 3/3208 |
| | | | | 345/212 |
| 2016/0314761 A1* | 10/2016 | Kim | ......................... | G09G 5/10 |
| 2018/0053463 A1* | 2/2018 | Kong | ........................ | G09G 3/20 |
| 2018/0089861 A1* | 3/2018 | Klement | ................ | G06T 11/001 |
| 2019/0007008 A1* | 1/2019 | Berkhout | ............. | H03K 17/162 |
| 2022/0190719 A1* | 6/2022 | Zanchi | .............. | G01R 19/16538 |

* cited by examiner

POWER SUPPLY REGULATION BASED ON IMAGE CONTENT

FIELD OF THE INVENTION

This disclosure relates generally to a power supply circuit, and more specifically to an adaptive power supply circuit based on an image to be displayed on a display panel.

BACKGROUND

The amount of power consumed by a display device may depend on the average brightness of an image being displayed. As such, as the average brightness of display frames change, the power consumption of the display device fluctuates accordingly. When there is a large difference in average brightness in consecutive frames, the power consumed by the display device changes rapidly. If the power supply circuit providing power to the display device is not able to quickly adapt to the change in power, the display device may overshoot or undershoot a supply voltage provided to the display device.

SUMMARY

Embodiments relate to a power supply circuit that receives an input supply voltage (e.g., from a battery) and generates an output supply voltage to power a display device where the operation of the power supply circuit is controlled based on the display data of the image to be displayed by the display device.

In one or more embodiments, the power supply unit adapts based on an image to be displayed by a display panel. The power supply unit includes a controller circuit for generating a control signal, and a converter circuit for generating an output supply voltage based on the control signal. The controller circuit includes a first look-up table (LUT) storing a set of lower limit values, and a second LUT storing a set of upper limit values. Moreover, the controller circuit includes a microcontroller for receiving an on-pixel-ratio (OPR) value and identifying an entry in the first LUT and the second LUT from the received OPR value. The controller circuit further includes an output circuit for generating the control signal between a first voltage corresponding to a lower limit stored in the identified entry in the first LUT and a second voltage corresponding to an upper limit stored in the identified entry in the second LUT.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Figure 1A:
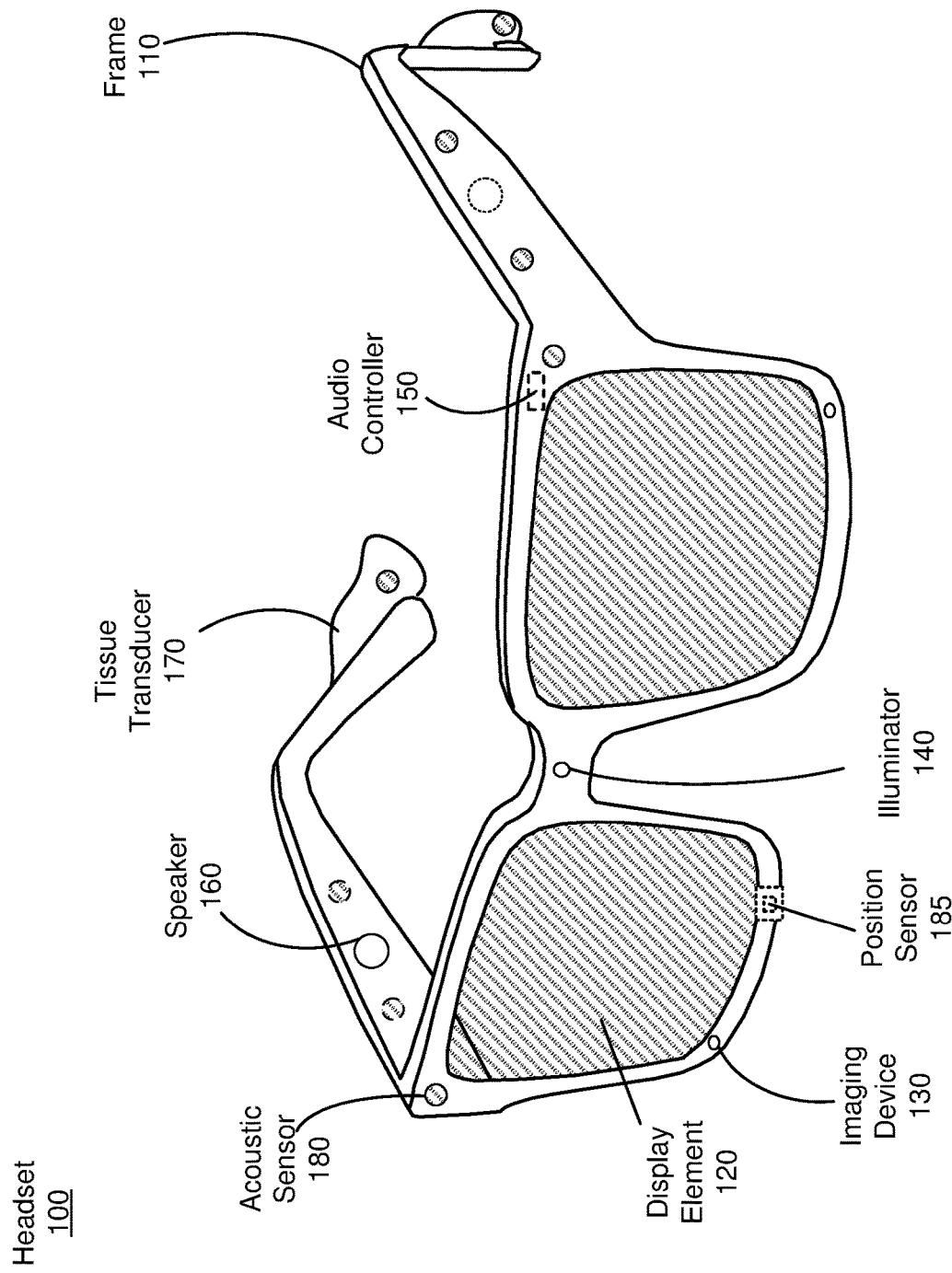
FIG. 1A is a perspective view of a headset implemented as an eyewear device, in accordance with one or more embodiments.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 185. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples)

to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The DCA may include an eye tracking unit that determines eye tracking information. The eye tracking information may comprise information about a position and an orientation of one or both eyes (within their respective eye-boxes). The eye tracking unit may include one or more cameras. The eye tracking unit estimates an angular orientation of one or both eyes based on images captures of one or both eyes by the one or more cameras. In some embodiments, the eye tracking unit may also include one or more illuminators that illuminate one or both eyes with an illumination pattern (e.g., structured light, glints, etc.). The eye tracking unit may use the illumination pattern in the captured images to determine the eye tracking information. The headset 100 may prompt the user to opt in to allow operation of the eye tracking unit. For example, by opting in the headset 100 may detect, store, images of the user's any or eye tracking information of the user.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 185 generates one or more measurement signals in response to motion of the headset 100. The position sensor 185 may be located on a portion of the frame 110 of the headset 100. The position sensor 185 may include an inertial measurement unit (IMU). Examples of position sensor 185 include: one or more accelerometers, one or more gyroscopes, one or more magnetometers, another suitable type of sensor that detects motion, a type of sensor used for error correction of the IMU, or some combination thereof. The position sensor 185 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 185 tracks the position (e.g., location and pose) of the headset 100 within the room. Additional details regarding the components of the headset 100 are discussed below in connection with FIG. 5.

Figure 1B:
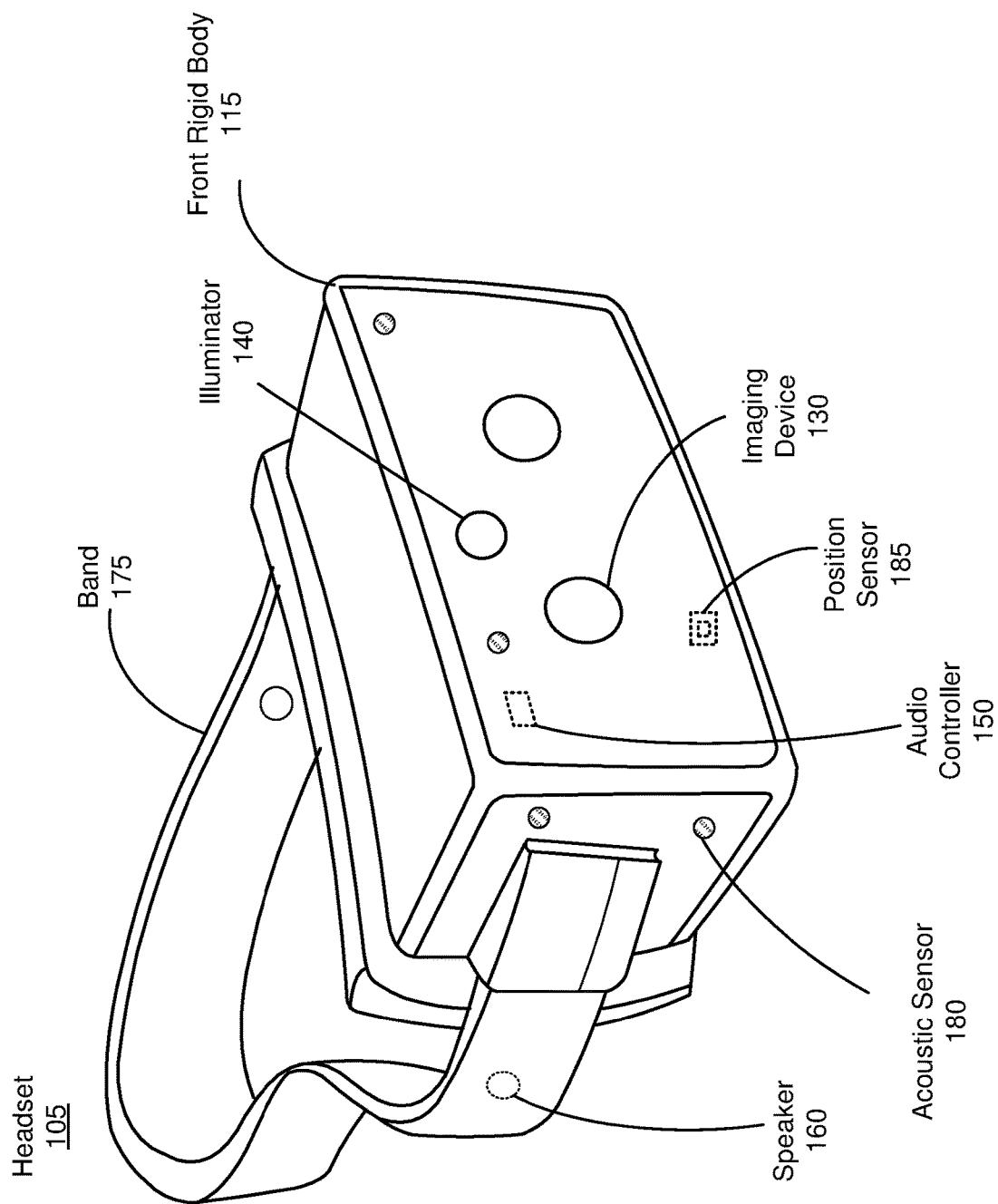
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 185. FIG. 1B shows the illuminator 140, a plurality of the speakers 160, a plurality of the imaging devices 130, a plurality of acoustic sensors 180, and the position sensor 185. The speakers 160 may be located in various locations, such as coupled to the band 175 (as shown), coupled to front rigid body 115, or may be configured to be inserted within the ear canal of a user.

Figure 1C:
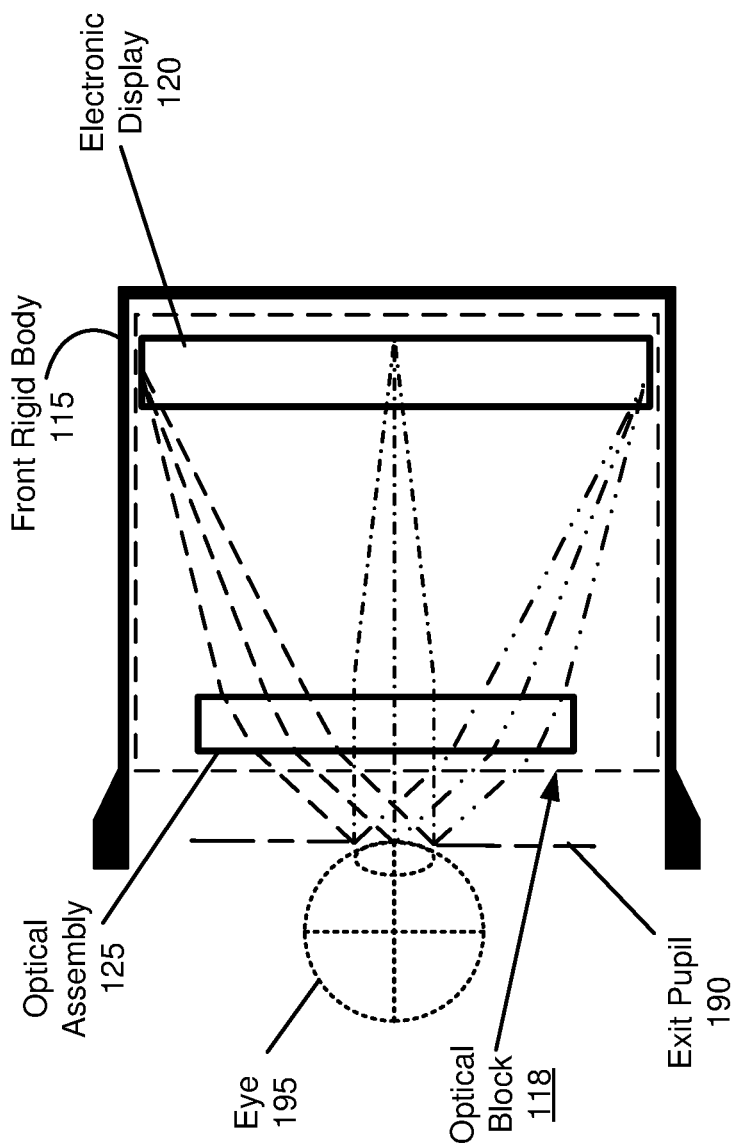
FIG. 1C is a cross section of the front rigid body of the head-mounted display shown in FIG. 1B.

FIG. 1C is a cross section of the front rigid body 115 of the head-mounted display shown in FIG. 1B. As shown in FIG. 1C, the front rigid body 115 includes an optical block 118 that provides altered image light to an exit pupil 190. The exit pupil 190 is the location of the front rigid body 115 where a user's eye 195 is positioned. For purposes of illustration, FIG. 1C shows a cross section associated with a single eye 195, but another optical block, separate from the optical block 118, provides altered image light to another eye of the user.

The optical block 118 includes a display element 120, and the optics block 125. The display element 120 emits image light toward the optics block 125. The optics block 125 magnifies the image light, and in some embodiments, also corrects for one or more additional optical errors (e.g., distortion, astigmatism, etc.). The optics block 125 directs the image light to the exit pupil 190 for presentation to the user.

System Architecture

Figure 2A:
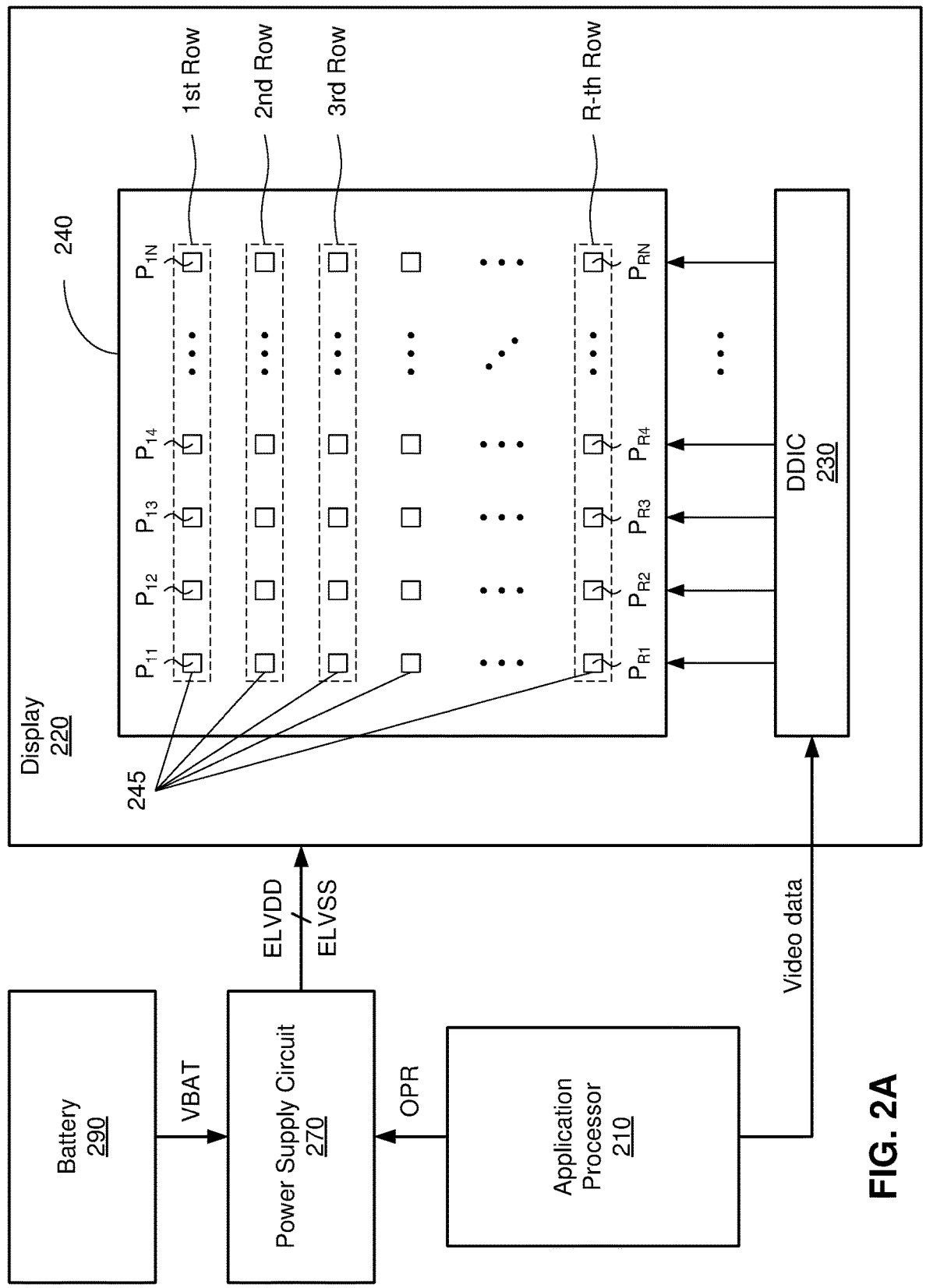
FIG. 2A illustrates a block diagram of an electronic display environment, in accordance with one or more embodiments.

FIG. 2A illustrates a block diagram of an electronic display environment 200, in accordance with one or more embodiments. The electronic display environment 200 includes an application processor 210 and a display device 220. In some embodiments, the electronic display environment 200 additionally includes a power supply circuit 270 for providing electrical power to the application processor 210 and the display device 220. In some embodiments, the power supply circuit 270 receives electrical power from a battery 280. In other embodiments, the power supply circuit 270 receives power from an electrical outlet.

The application processor 210 generates display data for controlling the display device to display a desired image. The display data include multiple pixel data, each for controlling one pixel of the display device to emit light with a corresponding intensity. In some embodiments, each pixel data includes sub-pixel data corresponding to different colors (e.g., red, green, and blue). Moreover, in some embodiments, the application processor 210 generates display data for multiple display frames to display a video.

The display device 220 includes a display driver integrated circuit (DDIC) 230, and a display area 240. In some embodiments, the display device 220 includes additional elements, such as one or more sensors. The display device 220 may be part of the HMD 100 in FIG. 1A or FIG. 1B. That is, the display device 220 may be an embodiment of the display element 120 in FIG. 1A or FIG. 1C.

In one embodiment, the display device 220 may display a plurality of frames of video content based on a global illumination where all the pixels 245 simultaneously illuminate image light for each frame. In an alternate embodiment, the display device 220 may display video content based on a segmented illumination where all pixels 245 in each segment of the display device 220 simultaneously illuminate image light for each frame of the video content. For example, each segment of the display device 220 may include at least one row of pixels 245 in the display device 220. In the illustrative case where each segment of the display device 220 for illumination includes one row of pixels 245, the segmented illumination can be referred to as a rolling illumination. In yet another embodiment, the display device 220 may display video content based on a controllable illumination where all pixels 245 in a portion of the display device 220 of a controllable size (not shown in FIG. 2A) simultaneously illuminate image light for each frame of the video content. The controllable portion of the display device 220 can be rectangular, square or of some other suitable shape. In some embodiments, a size of the controllable portion of the display device 220 can be a dynamic function of a frame number.

The display area 240 includes a set of pixels 245 organized in rows and columns. For example, the display area 240 includes N pixels ($P_{11}$ through $P_{1N}$) in the first row, N pixels ($P_{21}$ through $P_{2N}$) in the second row, N pixels ($P_{31}$ through $P_{3N}$) in the third row, and so on. Each pixel is controlled to provide a light output that corresponds to the display signal received from the application processor 210. For instance, in the case of an OLED panel, the display area 240 includes an array of pixels, each having an OLED that is capable of emitting light with a controllable intensity.

Figure 2B:
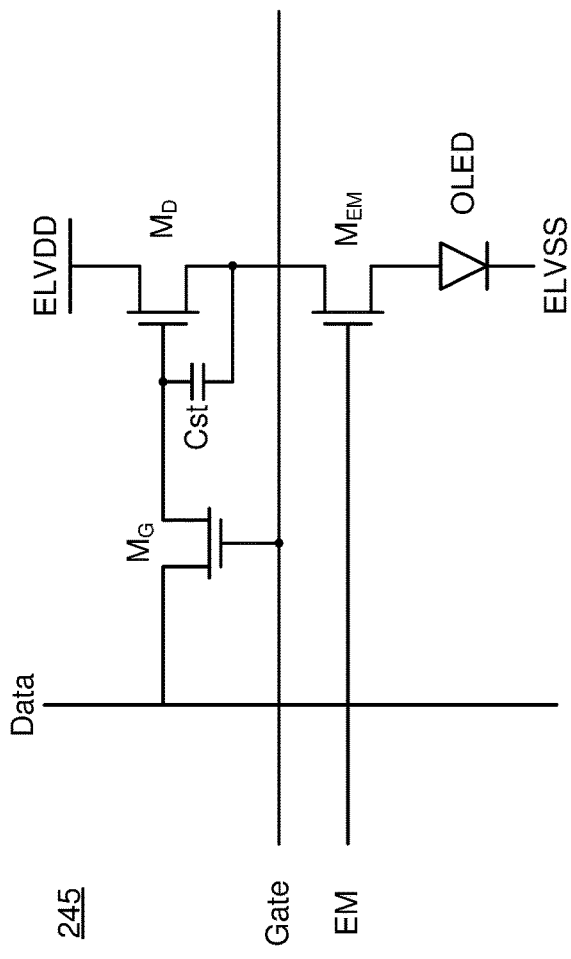
FIG. 2B illustrates an example OLED pixel structure for a pixel in the display area, in accordance with one or more embodiments.

FIG. 2B illustrates an example OLED pixel structure for a pixel 245 in the display area 240, in accordance with one or more embodiments. The pixel structure includes a driving transistor MD that is configured to generate a current proportional to a voltage stored by the storage capacitor Cst for driving the OLED. The OLED then generates light that is proportional to an amount of current provided by the driving transistor MD. Since the brightness of the pixel is proportional to the current being provided to the OLED, the amount of power consumed by the OLED is also proportional to the desired brightness of the OLED. That is, a display device 220 implemented using OLEDs consumes more power when displaying a brighter image compared to displaying a relatively darker image.

The gate transistor MG controls a connection between the gate of the driving transistor MD and the data line. When the gate line is asserted, the gate transistor MG turns on connecting the gate of the driving transistor MD to the data line and charging the storage capacitor Cst based on a voltage value provided at the data line. When the gate line is not asserted, the gate transistor MG is turned off, disconnecting the gate of the driving transistor MG from the data line. The emission transistor MEM controls a connection between the driving transistor MD and the OLED. When the emission signal EM is asserted, the emission transistor MEM turns on, connecting the driving transistor MD to the OLED. When the driving transistor MD is connected to the OLED, the driving transistor MD is turned on. In some embodiments, the data line is shared by a set of pixels disposed in a same column of the display area 240. Moreover, the gate line is shared by a set of pixels disposed in the same row of the display area.

Referring back to FIG. 2A, the DDIC 230 receives a display signal from the application processor 210, and generates control signals for controlling each pixel 245 in the display area 240. For example, the DDIC 230 generates signals to program each of the pixels 245 in the display area 240 according to an image signal received from the application processor 210. Moreover, the DDIC 230 generates a signal to turn on a driving transistor of one or more pixels 245 at predetermined periods of time.

Adaptive Power Supply Circuit

Figure 2C:
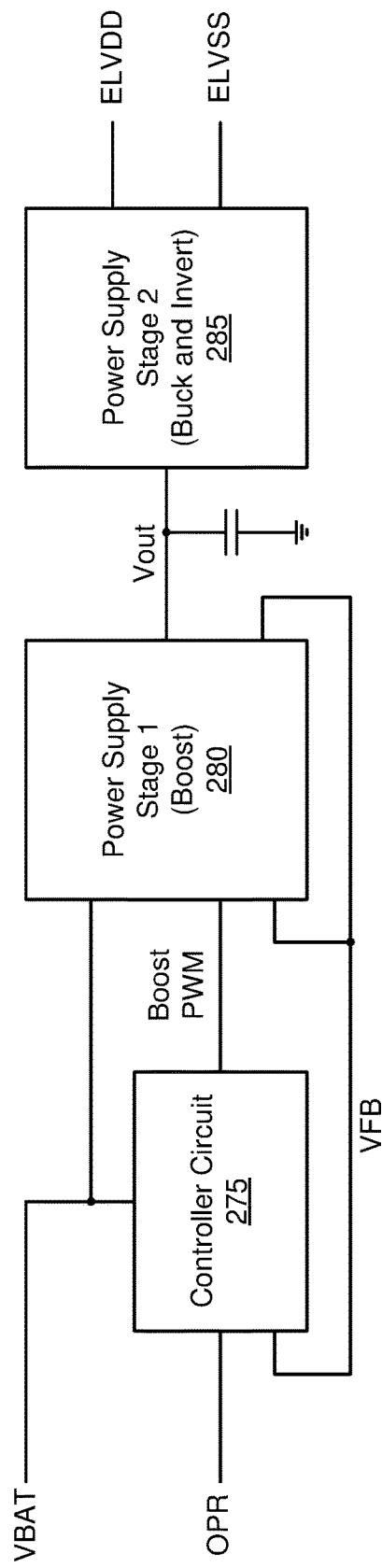
FIG. 2C illustrates a block diagram of the power supply circuit, in accordance with one or more embodiments.

FIG. 2C illustrates a block diagram of the power supply circuit 270, in accordance with one or more embodiments. The power supply 270 includes, among other components, a controller circuit 275, a first stage 280, and a second stage 285.

The controller circuit 275 receives at least an on-pixel-ratio (OPR) value from the application processor 210 and generates a boost pulse-width-modulation (PWM) control signal for controlling the first stage 280 of the power supply circuit 270. Alternatively, the controller circuit 275 receives the OPR value from the DDIC 230 of the display device 220, or determines the OPR value internally based on information (e.g., video data) received from the application processor 210 or the display device 220. In some embodiments, the controller circuit 275 additionally receives a battery voltage level VBAT from the batter 290, and a feedback voltage VFB from the first stage 280 of the power supply circuit 270. Based on the OPR, VBAT and VFB, the controller circuit generates the boost PWM control signal for controlling the first stage 280 of the power supply circuit 270

The OPR may be determined based the digital values of each of the pixels of the image to be displayed. For example, the OPR may be determined as:

$$OPR = \frac{\sum_{all\ sub-pixels} grayscale\_level}{\sum_{all\ sub-pixels} max\_grayscale\_level} \quad (1)$$

For example, if the display device is rectangular, the OPR may be determined as:

$$OPR = \frac{100}{max\_grayscal\_level \times R \times N} \sum_{j=1}^{R} \sum_{i=1}^{N} grayscale\_level_{ij} \quad (2)$$

Where N is the number of pixels in a columns, R is the number of rows, $gray\_scale\_level_{ij}$ is the gray scale value of the pixel (or sub-pixel) located at the i-th column and the j-th row, and max_gray_scal_level is the maximum grayscale value for a pixel (e.g., 255).

In other embodiments, the OPR value is determined using a predefined function $f(x)$ as follows:

$$OPR = \frac{100}{f(max\_grayscal\_level) \times R \times N} \sum_{j=1}^{R} \sum_{i=1}^{N} f(grayscale\_level_{ij}) \quad (3)$$

For instance, the predefined function $f(x)$ may be the gamma function:

$$f(x) = A \cdot x^\gamma \quad (4)$$

Where A and γ are a constant value (e.g., 1 and 2.2 respectively).

Since the OPR is based on the image to be displayed and not based on properties of the power supply circuit or the display device, the OPR may be determined by the application processor 210 to reduce an amount of data to be transferred to the power supply circuit 270. That is, the application processor 210 may include custom circuitry or may run a custom firmware to enable the calculation of the OPR. Alternatively, to enable the power supply circuit 270 to be used with unmodified application processors, the power supply circuit 270 may receive display data from the application processor 210 or the DDIC 230 and the power supply circuit determines the OPR for the image to be displayed internally. For example, the same video data being provided to the DDIC 230 may be provided to the power supply circuit 270 to enable the power supply circuit 270 to calculate the OPR. In yet other embodiments, the power supply circuit receives the OPR from the display device 220. For example, the DDIC 230 of the display device 220 determines the OPR from the video data the DDIC receives from the application processor 210, and the DDIC 230 provides the OPR to the power supply circuit 270.

Figure 3A:
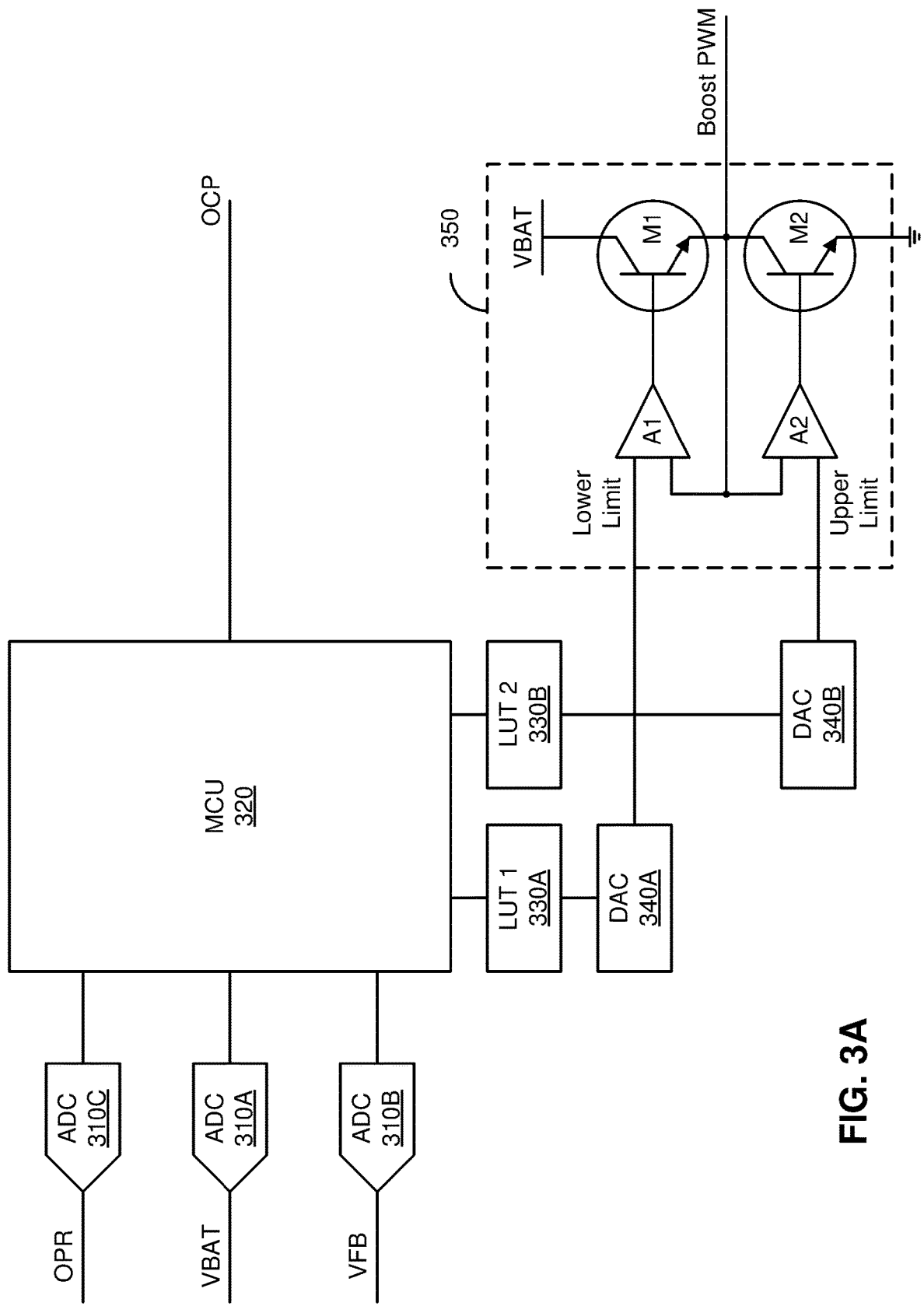
FIG. 3A illustrates a circuit diagram of the controller circuit, in accordance with one or more embodiments.

FIG. 3A illustrates a circuit diagram of the controller circuit 275, in accordance with one or more embodiments. The controller circuit 275 includes one or more analog-to-digital converters (ADC) 310, a microcontroller unit (MCU) 320, a pair of look-up-tables (LUT) 330, a pair of digital-to-analog converters (DAC) 340, and an output circuit 350.

The ADC 310 receives an analog signal and outputs a digital representation of the analog signal. In the example of FIG. 3A, the controller circuit 275 includes three ADCs: A first ADC 310A that receives the battery voltage VBAT from the battery 290, a second ADC 310B that receives a feedback voltage VFB from the first stage 280 of the power supply circuit 270, and a third ADC 310C that receives the OPR value from the application processor 210. In some embodiments, if one or more signals (e.g., the OPR signal) is a digital signal, fewer ADCs than shown in FIG. 3A may be used.

The MCU 320 receives digital inputs and selects an entry from each LUT 330. The MCU 320 may perform a calculation based on the digital representations of the OPR, VBAT, and VFB to determine an index in each of the LUT. For example, the MCU 320 may assign a weight to each input value and aggregate the inputs based on their weight.

The LUTs 330 are programmed to store configuration values for the first stage 280 of the power supply circuit 270. The first LUT 330A stores a lower boundary for the first stage 280 of the power supply circuit 270. The second LUT 330B stores an upper boundary for the first stage 280 of the power supply circuit 270.

In some embodiments, the first LUT 330A and the second LUT 330B are configured during the manufacturing of the display device 220. In some embodiments, a training video is used to populate the LUTs 330. The training video is played by the display device 220 and an amount of power that the display device uses to display images having various OPR values are measured. Based on those measurements, the first LUT 330A and the second LUT 330B are populated.

In some embodiments, the controller circuit 275 keeps learning after then first LUT 330A and the second LUT 330B have been populated and updates the first LUT 330A and second LUT 330B based on new power consumption measurements. For instance, during a normal use of the display device 220, the power supply circuit 270 periodically measures an amount of power being consumed by the display device 220 and updates corresponding entries in the first LUT 330A and the second LUT 330B based on the OPR value, the VBAT value and the VFB value that was received by the MCU 320 when the measurement was performed.

The DACs 340 converts a digital value retrieved from each of the LUTs 330 to an analog voltage. The first DAC 340A receives a digital value retrieved from the first LUT 330A and generates a voltage representing a lower limit for the boost PWM control signal. The second DAC 340B receives a digital value retrieved from the second LUT 330B and generates a voltage representing an upper limit for the boost PWM control signal.

In some embodiments, each DAC 340 is implemented using a PWM generator that generates a PWM signal having a pulse width corresponding to the digital value retrieved from the corresponding LUT 330, and a low pass filter (LPF) that generates an analog voltage corresponding to the DC value of the PWM signal.

In other embodiments, each DAC is implemented using other topologies, such as using reference voltage and/or demultiplexers, using a resistor ladder, using an operational amplifier, or any other suitable architecture.

The output circuit generates the boost PWM control signal from the lower limit voltage generated by the first DAC 340A and the upper limit voltage generated by the second DAC 340B. The output circuit includes a first differential amplifier A1 that receives the lower limit voltage and generates a first signal for controlling a first transistor M1. The output circuit further includes a second differential amplifier A2 that receives the upper limit voltage and generates a second signal for controlling a second transistor M2. The first transistor M1 and the second transistor M2 are connected in series between a first supply voltage (e.g., VBAT) and a second supply voltage (e.g., GND).

Referring back to FIG. 2C, the first stage 280 of the power supply circuit 270 receives the boost PWM control signal and generates an output voltage Vout. In some embodiments, the first stage 280 of the power supply circuit 270 generates the output voltage Vout from the battery voltage VBAT.

Figure 3B:
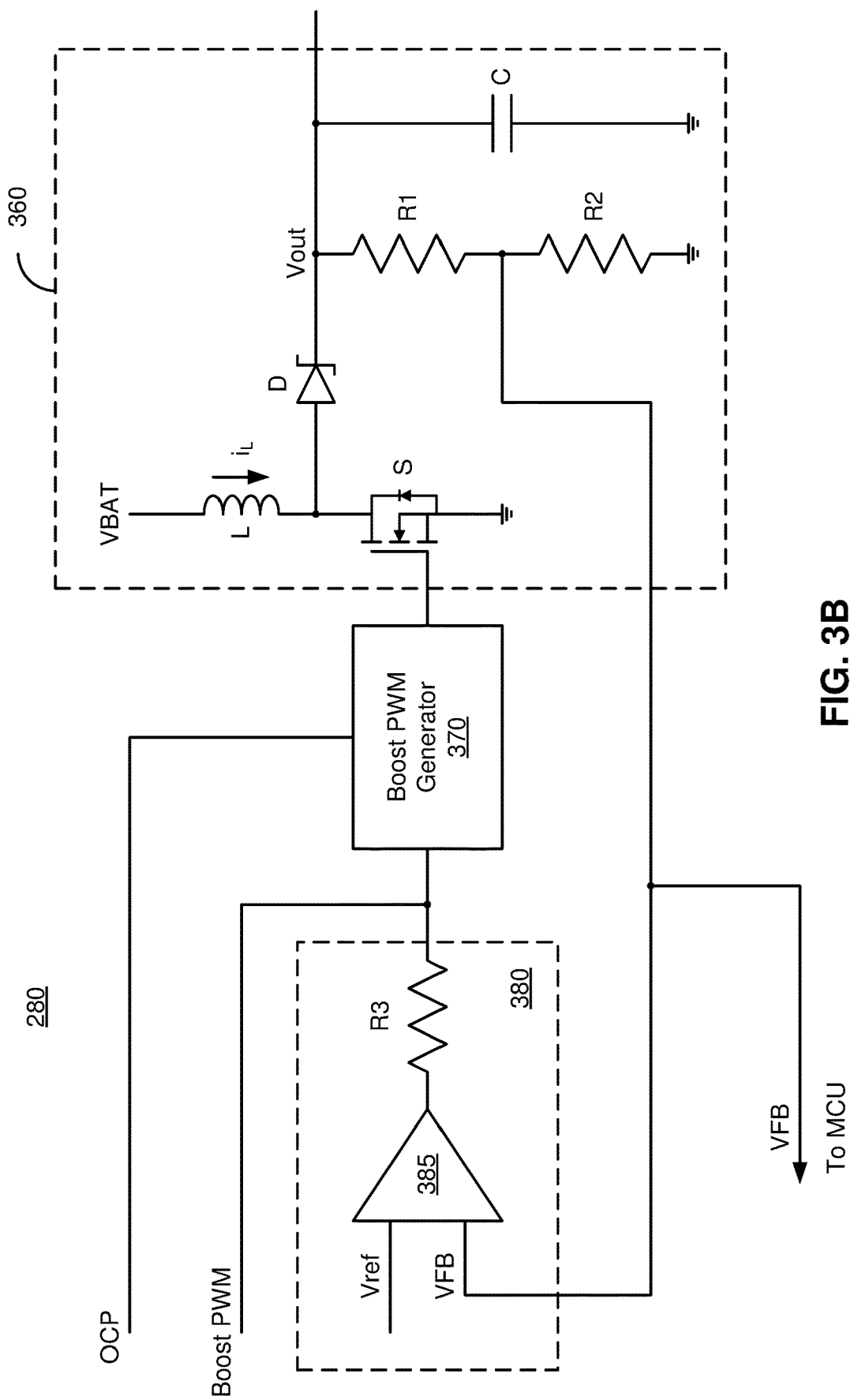
FIG. 3B illustrates a circuit diagram of the first stage of the power supply circuit, in accordance with one or more embodiments.

FIG. 3B illustrates a circuit diagram of the first stage 280 of the power supply circuit 270, in accordance with one or more embodiments. The first stage 280 includes a boost converter 360, a boost PWM generator 370, and a feedback circuit 380.

In some embodiments, the boost converter 360 includes an inductor L, a switch S, a diode D, and a capacitor C. In some embodiments, the boost converter 360 additionally includes resistors R1 and R2 to provide a feedback voltage VFB. The switch S is controlled based on an output of the boost PWM generator 370. When the boost PWM generator 270 outputs a signal having a first level (e.g., a high level), the switch S turns on connecting the inductor L to ground. When the switch S is closed, the inductor L is charged based on the battery voltage VBAT. Moreover, when the e boost PWM generator 270 outputs a signal having a second level (e.g., a low level), the switch S turns off disconnecting the inductor L form ground. When the inductor L is disconnected from ground, the inductor is connected to capacitor C through diode D. During this period of time, the inductor current $i_L$ flows into capacitor C charging capacitor C, and to a load connected to the output of the boost converter 360 (i.e., to the second stage 285 of the power supply circuit 270.

The boost PWM generator 370 generates a PWM signal for controlling the switch S of the boost converter 360 based on the value of the boost PWM signal. In some embodiments, the boost PWM generator 370 further generates the PWM signal for controlling the switch S of the boost converter 360 based on the feedback voltage VFB. In some embodiments, the PWM signal for controlling the switch S is generated as having a duty cycle corresponding to a value of the boost PWM signal. Moreover, the PWM signal for controlling the switch S may be adjusted based on the voltage level of the feedback voltage VFB. For instance, if the feedback voltage indicates that the output voltage of the boost converter 360 is larger than a reference voltage, the boost PWM generator 370 is controlled to reduce the duty cycle of the PWM signal for controlling the switch S. Conversely, if the feedback voltage indicates that the output voltage of the boost converter 360 is smaller than a reference voltage, the boost PWM generator 370 is controlled to increase the duty cycle of the PWM signal for controlling the switch S.

In some embodiments, the boost PWM generator 370 receives an overcurrent protection (OCP) signal. The boot PWM generator 370 is turned off or is configured to generate an output having a value for opening switch S in response to receiving the OCP signal. The OCP signal may be generated by the MCU 320 based on one or more signals received by the MCU. In some embodiments, the OCP signal is generated in response to detecting a short circuit in the power supply circuit 270 (e.g., a short circuit in the first stage 280 of the power supply circuit 270).

The feedback circuit 380 receives the feedback voltage VFB and compares the feedback voltage VFB to a reference voltage Vref. The feedback circuit 380 includes a comparator 385 that generates an output corresponding to the difference between the feedback voltage VFB and the reference voltage Vref. In some embodiments, the feedback circuit further includes a resistor R3 that is connected between the output of the comparator 385 and the input of the boost PWM generator 370.

Referring back to FIG. 2C, the second stage 285 receives the output voltage Vout from the first state 280 and generates the supply voltages ELVDD and ELVSS for powering the OLEDs of pixels 245. The second stage 280 may include a buck converter that converts the output voltage having a first voltage level to a supply voltage ELVDD having a second voltage level (e.g., lower than the first voltage level). Moreover, the second stage 285 may include an inverter to generate a negative voltage to generate a second supply voltage ELVSS having a third voltage level (e.g., a negative voltage level).

Figure 4:
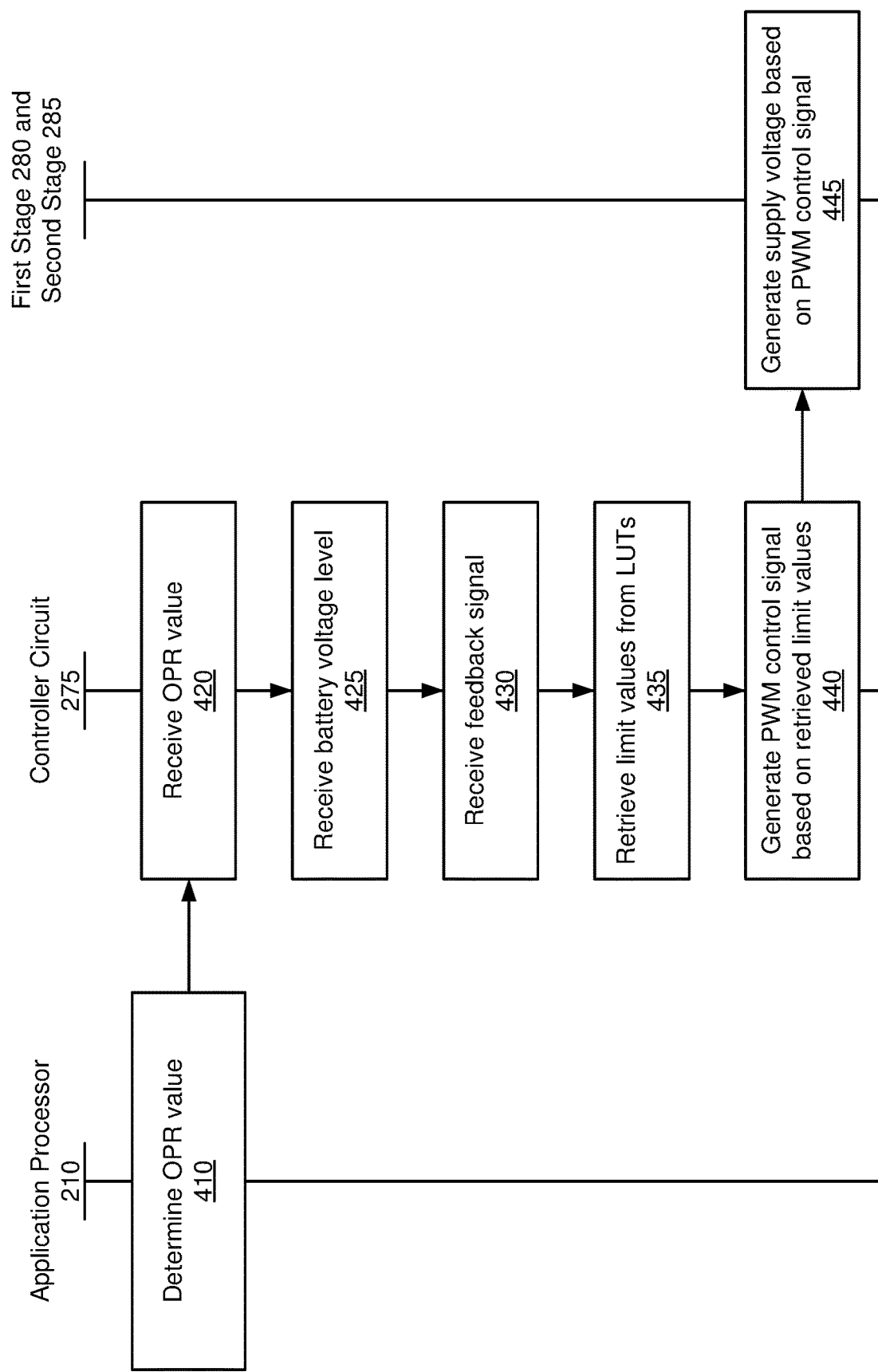
FIG. 4 is a flowchart of a for controlling the power supply, in accordance with one or more embodiments.

FIG. 4 is a flowchart of a for controlling the power supply 270, in accordance with one or more embodiments. The process shown in FIG. 4 may be performed by the application processor 210, the display device 220, or the power supply circuit 270. Other entities may perform some or all of the steps in FIG. 3 in other embodiments. Embodiments may include different and/or additional steps, or perform the steps in different orders.

The application processor 210 determines 410 the OPR value for an image to be displayed by the display device 220 during a next display frame. The OPR value is determined based on the digital brightness values for each pixel of the image to be displayed by the display device 220 during the next display frame.

The controller circuit 275 of the power supply 270 receives 420 the OPR value from the application processor 210. The controller circuit 275 additionally receives 425 a battery voltage level VBAT signal from the battery 290, and receives 430 a feedback signal VFB from the first stage 280 of the power supply 270.

Based on the OPR signal, the battery voltage level VBAT, and the feedback signal VFB, the controller circuit 270 selects an entry from the first LUT 330A and the second LUT 330B. For instance, the controller circuit 270 computes a lookup index based on a combination of the OPR, VBAT and VFB signals. The controller circuit 270 then retrieves 435 a lower limit value from the first LUT 330A and an upper limit value from the second LUT 330B.

Based on the retrieved lower limit value and upper limit value, the controller circuit 270 generates 440 a PWM control signal. In some embodiments, the generated PWM control signal is between the lower limit value and the upper limit value.

The power supply 270 then generates 445 one or more supply voltages using the PWM control signal. For example, the power supply 270 generates a first supply voltage ELVDD and a second supply voltage ELVSS for driving OLEDs of each of the pixels in the display device 220. In particular, the first stage 280 generates an output voltage Vout (intermediate voltage) using power from the battery 290 and the PWM control signal. The second stage 285 then generates the first supply voltage ELVDD and the second supply voltage ELVSS from the output voltage Vout generated by the first stage 280.

The one or more supply voltages are then provided to the display device 220 for powering the display device. Since the supply voltages are generated based on a brightness level of the image to be displayed by the display device 220 in a subsequent frame, the power supply 270 is able to adapt to fluctuations and spikes in power consumption by the display device due to large variations in brightness levels of images displayed in consecutive frames.

System Environment

Figure 5:
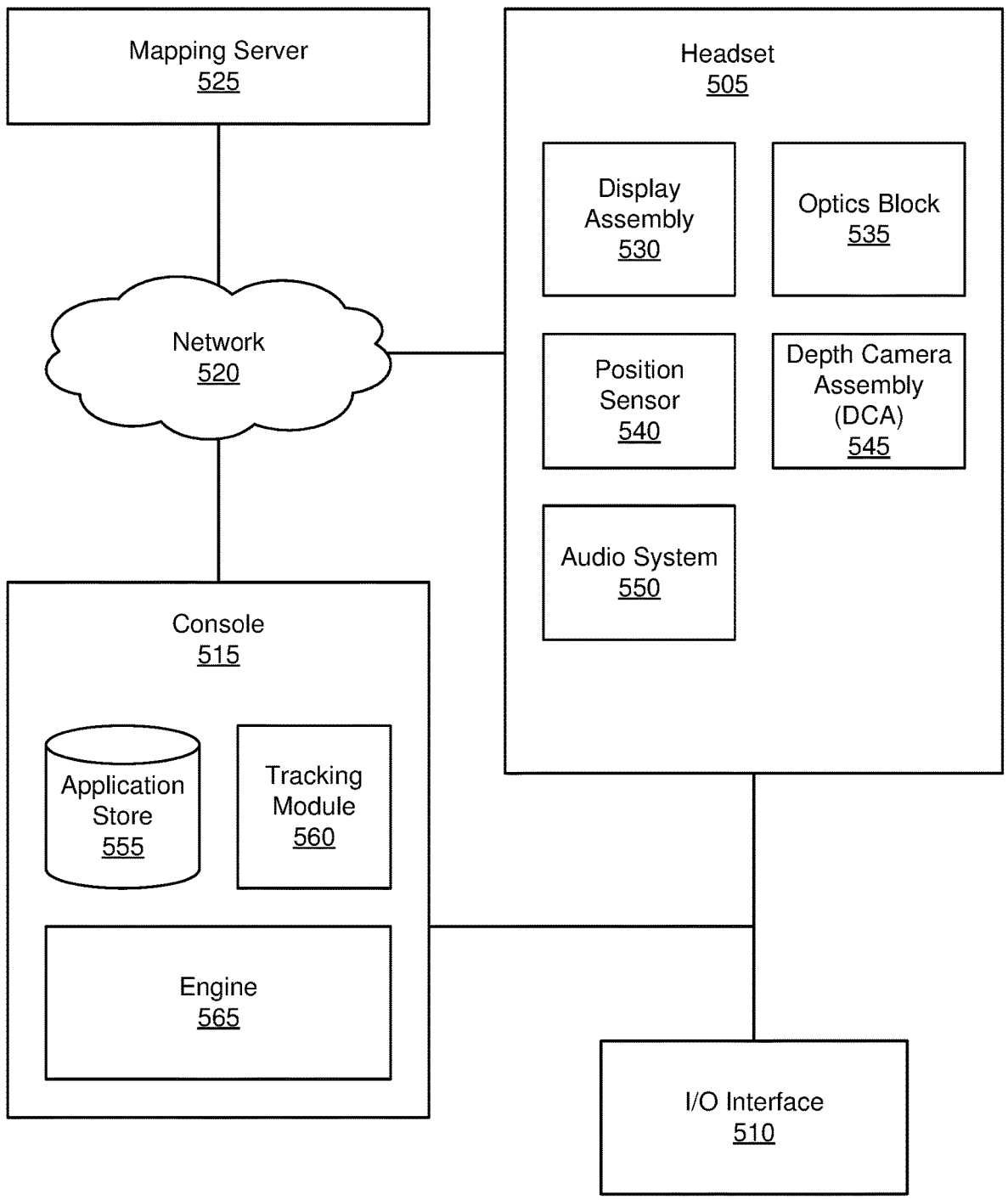
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, and the DCA 545. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 120). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 185 is an embodiment of the position sensor 540. Examples of a position sensor 540 include: one or more IMUS, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The audio system 550 provides audio content to a user of the headset 505. The audio system 550 is substantially the same as the audio system 200 describe above. The audio system 550 may comprise one or acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area.

The audio system 550 may provide information describing at least a portion of the local area from e.g., the DCA 545 and/or location information for the headset 505 from the position sensor 540. The audio system 550 may generate one or more sound filters using one or more of the acoustic parameters received from the mapping server 525, and use the sound filters to provide audio content to the user.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed.

Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A power supply unit comprising:
a controller circuit for generating a control signal, the controller circuit including:
   a first look-up table (LUT) storing a set of lower limit values,
   a second LUT storing a set of upper limit values,
   a microcontroller configured to receive an on-pixel-ratio (OPR) value and identifying an entry in the first LUT and the second LUT from received OPR value,
   a first digital-to-analog converter (DAC) for receiving a lower limit stored in the identified entry in the first LUT and generate a first voltage corresponding to the lower limit,
   a second DAC for receiving an upper limit stored in the identified entry in the second LUT and generate a second voltage corresponding to the upper limit, and
   an output circuit configured to generate the control signal between the first voltage and the second voltage at an output terminal, the output circuit comprising:
      a first differential amplifier receiving the first voltage and the control signal to generate a first amplifier signal,
      a second differential amplifier receiving the second voltage and the control signal to generate a second amplifier signal,
      a first transistor having an input terminal coupled to an output terminal of the first differential amplifier to receive the first amplifier signal, a drain of the first transistor coupled to the output terminal, and
      a second transistor having an input terminal coupled to an output terminal of the second differential amplifier to receive the second amplifier signal, a source of the second transistor coupled to the drain of the first transistor and the output terminal, and
a converter circuit coupled to an output of the controller circuit, the converter circuit configured to receive an input supply voltage and generate an output supply voltage based on the control signal.

2. The power supply unit of claim 1, wherein the OPR value is determined by adding a grayscale level of each pixel of an image to be displayed by a display panel.

3. The power supply unit of claim 1, wherein the OPR value is indicative of a ratio between an expected brightness of a display panel during a current frame and a maximum brightness of the display panel.

4. The power supply unit of claim 1, wherein the first DAC comprises:
a pulse-width-modulation (PWM) circuit for generating a periodic signal having a duty cycle corresponding to the lower limit stored in the identified entry in the first LUT; and
a low-pass filter (LPF) coupled to an output of the PWM circuit, the LPF for generating an analog voltage corresponding to a direct current (DC) level of the periodic signal generated by the PWM circuit.

5. The power supply unit of claim 1, wherein the microcontroller is further configured to receive a battery level corresponding to a voltage level of a battery, and a feedback voltage level from the converter circuit, and wherein the microcontroller is further configured to identify the entry in the first LUT and the second LUT based on the battery level and the feedback voltage level.

6. The power supply unit of claim 5, wherein the microcontroller is configured to compute an index value by combining the OPR value, the battery level, and the feedback voltage level, and to identify the entry in the first LUT and the second LUT based on the computed index value.

7. The power supply unit of claim 1, wherein the first LUT is programmed by displaying a training video on a display panel, and sensing an amount of power consumed by the display panel.

8. The power supply unit of claim 1, wherein the control signal is a pulse-width-modulation (PWM) signal for controlling at least one of a buck converter, a boost converter, and a buck-boost converter.

9. A method comprising:
receiving an on-pixel-ratio (OPR) value calculated from grayscale levels of each pixel in an image to be displayed by a display panel;
identifying a first entry in a first look-up table (LUT) from the received OPR value;
generating a first voltage by converting a lower limit stored in the identified first entry in the first LUT to a first analog voltage corresponding to the lower limit;
identifying a second entry in a second LUT from the received OPR value;
generating a second voltage by converting an upper limit stored in the identified second entry in the second LUT to a second analog voltage corresponding to the upper limit;
generating a first amplifier signal responsive to receiving the first voltage and a control signal between the first voltage and the second voltage;
generating a second amplifier signal responsive to receiving the second voltage and the control signal;
generating the control signal at an output terminal coupled to a drain of a first transistor and source of a second transistor; and
controlling a converter circuit using the control signal, the converter circuit generating an output supply voltage from an input supply voltage based on the control signal.

10. The method of claim 9, wherein the OPR value is determined by adding a grayscale level of each pixel of the image to be displayed by the display panel.

11. The method of claim 9, wherein the OPR value is indicative of a ratio between an expected brightness of the display panel during a current frame and a maximum brightness of the display panel.

12. The method of claim 9, wherein converting the lower limit stored in the identified first entry in the first LUT to a first analog voltage comprises:
generating a periodic signal having a duty cycle corresponding to the lower limit stored in the identified entry in the first LUT; and
generating the first analog voltage corresponding to a direct current (DC) level of the generated periodic signal.

13. The method of claim 9, further comprising:
receiving a battery level corresponding to a voltage level of a battery; and
receiving a feedback voltage level from the converter circuit; and
wherein the first entry in the first LUT and the second entry in the second LUT are identified based on the battery level and the feedback voltage level.

14. The method of claim 13, further comprising:
computing an index value by combining the OPR value, the battery level, and the feedback voltage level; and
identifying the first entry in the first LUT and the second entry in the second LUT based on the computed index value.

15. The method of claim 9, further comprising:
programming the first LUT and the second LUT by displaying a training video on the display panel, and sensing an amount of power consumed by the display panel.

16. The method of claim 9, wherein the control signal is a pulse-width-modulation (PWM) signal for controlling at least one of a buck converter, a boost converter, and a buck-boost converter.

17. A controller circuit for generating a control signal for controlling a converter circuit, the controller circuit comprising:
a first look-up table (LUT) storing a set of lower limit values;
a second LUT storing a set of upper limit values;
a microcontroller coupled to the first LUT and the second LUT, the microcontroller configured to receive an on-pixel-ratio (OPR) value and identifying an entry in the first LUT and the second LUT from received OPR value;
a first digital-to-analog converter (DAC) for receiving a lower limit stored in the identified entry in the first LUT and generate a first voltage corresponding to the lower limit,
a second DAC for receiving an upper limit stored in the identified entry in the second LUT and generate a second voltage corresponding to the upper limit; and
an output circuit coupled to the microcontroller, the output circuit configured to generate the control signal between the first voltage and the second voltage at an output terminal, the output circuit comprising:
a first differential amplifier receiving the first voltage and the control signal to generate a first amplifier signal,
a second differential amplifier receiving the second voltage and the control signal to generate a second amplifier signal,
a first transistor having an input terminal coupled to an output terminal of the first differential amplifier to receive the first amplifier signal, a drain of the first transistor coupled to the output terminal, and
a second transistor having an input terminal coupled to an output terminal of the second differential amplifier to receive the second amplifier signal, a source of the second transistor coupled to the drain of the first transistor and the output terminal.

* * * * *